July 5, 1938.　　　　T. GANNESTAD　　　　2,123,039
AUTOMATIC CONE VALVE
Filed Jan. 24, 1936　　　　3 Sheets-Sheet 1
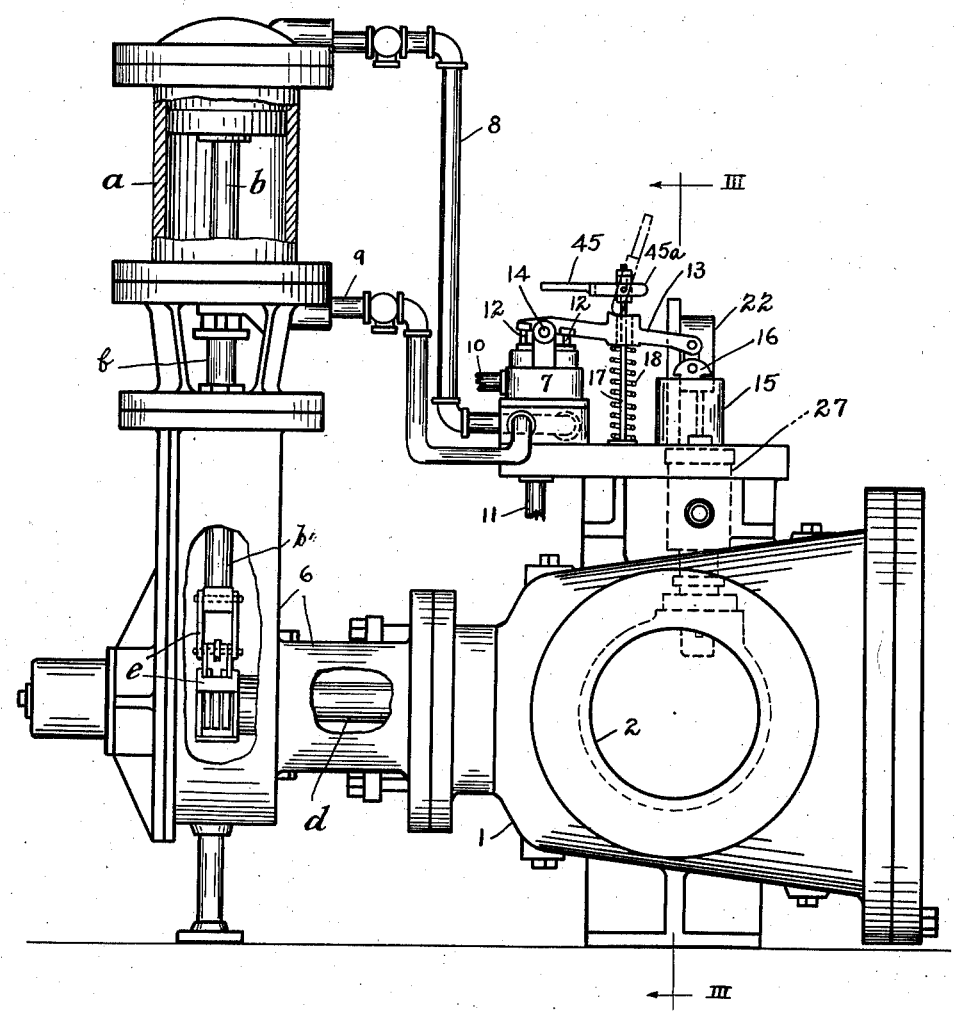
Fig. I.
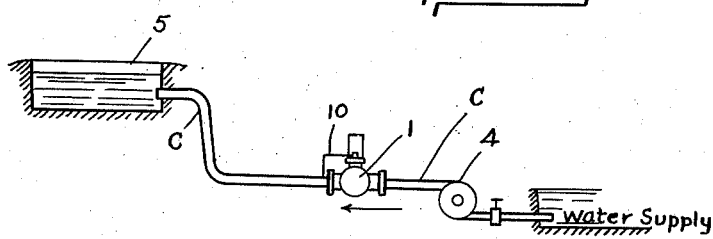
Fig. II.
INVENTOR
Thor Gannestad
BY Christy and Wharton
ATTORNEYS

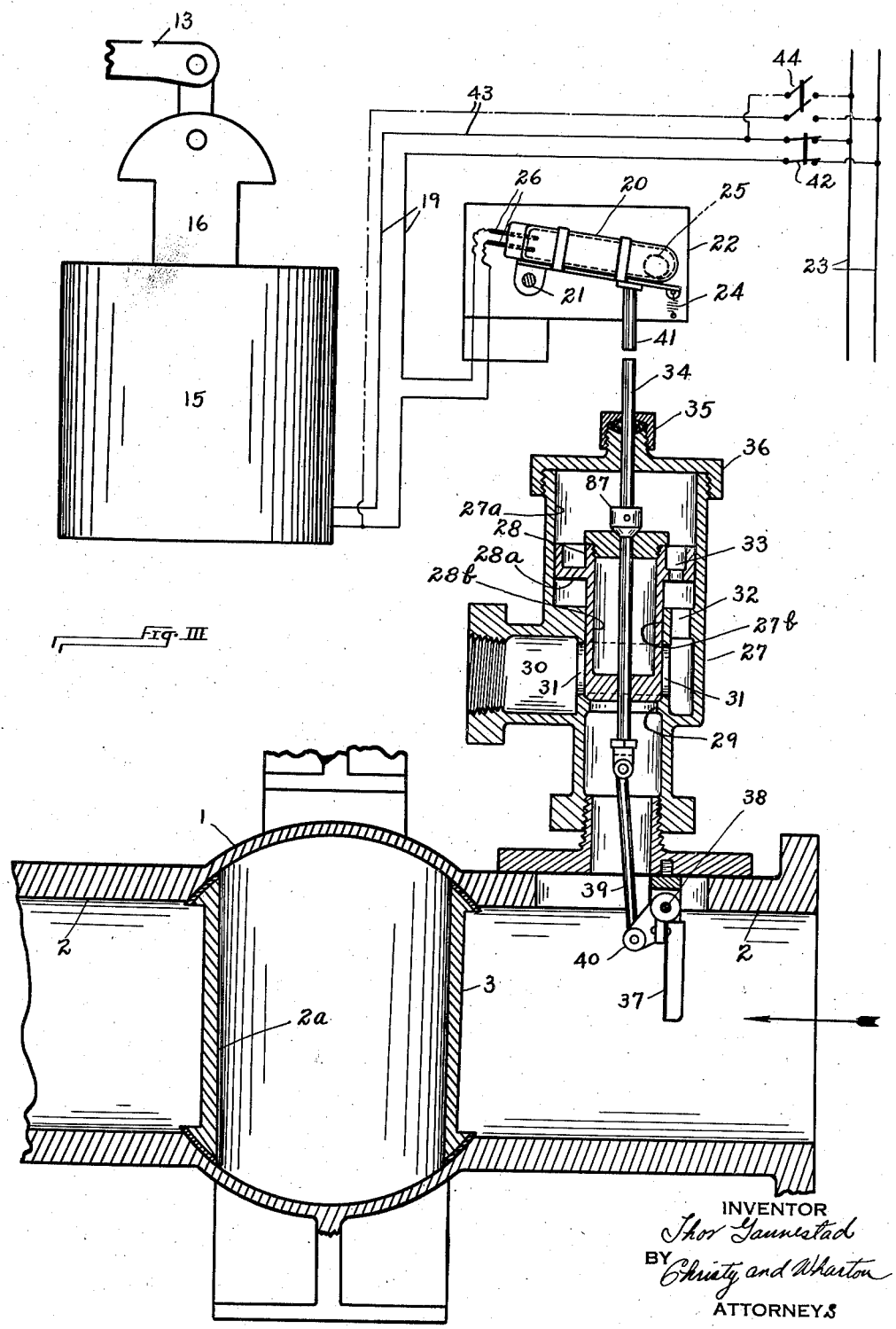

July 5, 1938.    T. GANNESTAD    2,123,039
AUTOMATIC CONE VALVE
Filed Jan. 24, 1936    3 Sheets-Sheet 3
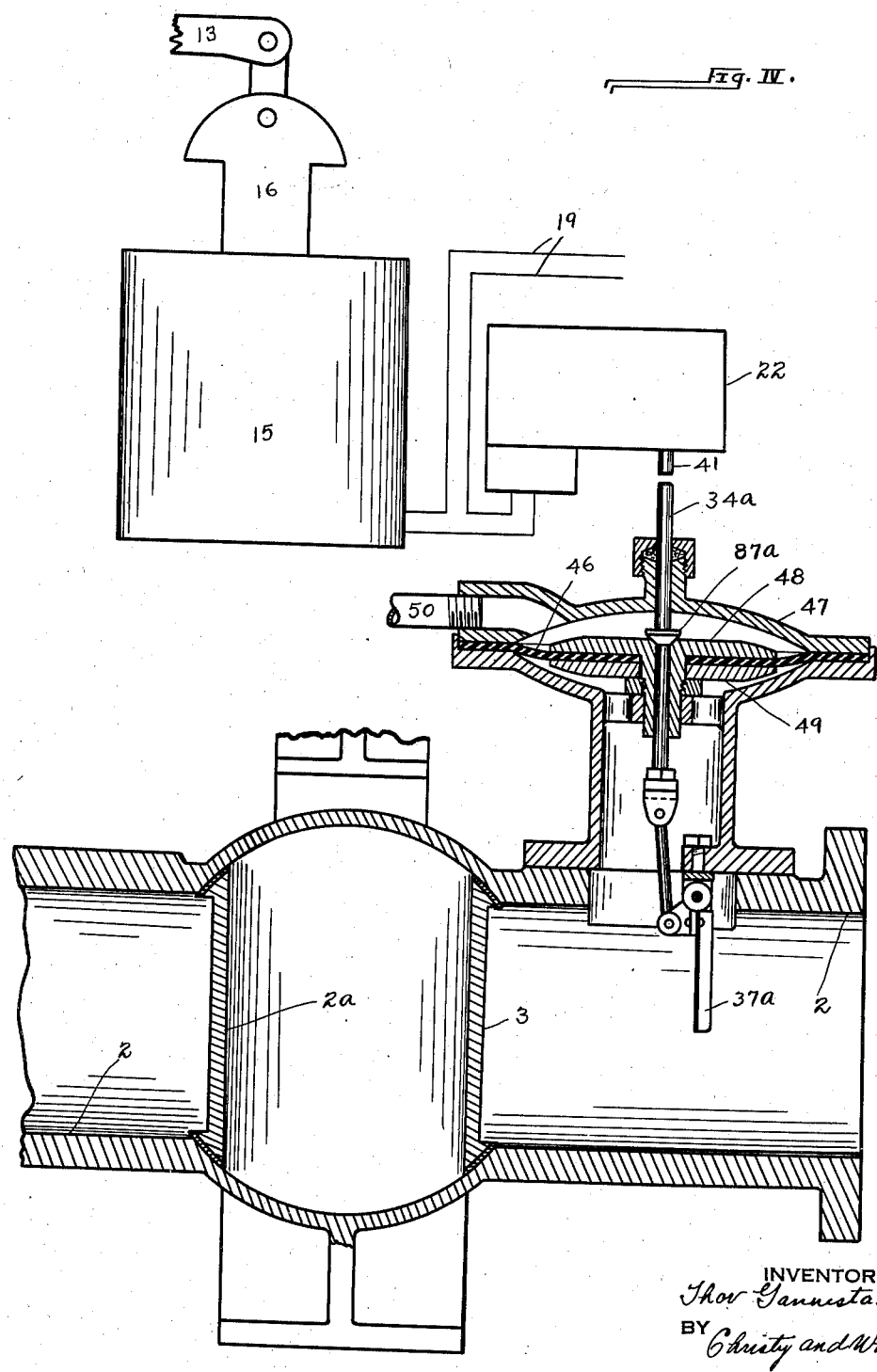
Fig. IV.
INVENTOR
Thor Gannestad
BY Christy and Wharton
ATTORNEYS Patented July 5, 1938

2,123,039

UNITED STATES PATENT OFFICE 2,123,039

AUTOMATIC CONE VALVE

Thor Gannestad, Pittsburgh, Pa.

Application January 24, 1936, Serial No. 60,586

10 Claims. (Cl. 137—139)

My invention relates to automatic valves, and consists in means for controlling the operation of such valves.

As illustrative of one of the various uses to which automatic valves are put, I shall mention a typical city water supply system which includes a reservoir. The reservoir is normally located on an eminence within or adjacent to the district to be supplied, and a pump is employed to force water through a conduit running to the reservoir from a body of supply water lying at lower elevation. The pump ordinarily is organized at substantially the elevation of the body of supply water, and between the pump and the reservoir an automatic valve is included in the conduit. And means responsive to the hydraulic head on the high pressure side of the valve, or to the hydraulic head in a stand-pipe, are arranged to effect the powerful opening and closing of the valve. Such means usually embody a piston and cylinder unit, or some other type of hydraulic motor, and means are provided for so controlling the supply of high pressure fluid to the motor that, under predetermined conditions, the valve is automatically opened and closed. For example, if the pump fails in operation, or if a break occurs in the conduit on the low pressure or pump side of the valve, or if the delivery of the pump falls below a predetermined critical value, or if the water in the reservoir rises above a given level, the valve is automatically closed. On the other hand, when the valve is closed and the pump is brought into operation, the valve is automatically opened. And the automatic operation of the valve may be made subject to still other conditions in the field.

In recent years electrically driven pumps have in large measure replaced steam driven pumps. Many recognized advantages attend the use of electric power in pumping stations, and for this reason there has been a growing demand for electrically controlled valves; that is, valves whose above-mentioned operations (or other known operations) are controlled by automatic electrical means. My invention consists in means of this sort.

I am aware that the use of electric solenoids in the control of automatic valves is years old, and that it is old to provide electric means for effecting the automatic closing of a valve upon the failure of current supply to an associated electrically driven pump.

More particularly, my invention lies in refinements and elaborations in automatic electric means, in conjunction with manual control means, for controlling a powerfully operated valve, and, while the failure of current supply to an associated electrically driven pump may in known way be adapted to control the automatic closing of the valve, it will be understood that essentially my electrical means, in controlling the desired operations of the valve, respond to both the pressure and the velocity of the stream of fluid controlled by the valve. And advantageously my valve-controlling apparatus embodies a mercury switch in particularly effective organization.

The electrical apparatus of this invention is particularly, although not exclusively, adapted for the control of automatic cone valves of the sort shown in my co-pending application for Letters Patent, Serial No. 754,042, filed November 21, 1934, now Patent No. 2,034,291, dated March 17, 1936, and in Fig. I of the accompanying drawings such a valve is shown, equipped with electrical control means in accordance with the invention.

Fig. II is a diagrammatic view of a typical installation.

Fig. III is a fragmentary sectional view of the apparatus, to larger scale, and taken on the plane III—III of Fig. I.

And Fig. IV is a view, comparable with Fig. III, illustrating a modification in the control apparatus.

In Fig. I of the drawings, the body of the cone valve is denoted by the reference numeral 1. The valve is adapted to be connected in known way in a conduit C (Fig. II), with the passage 2 of the valve aligned with the passage within the conduit. The valve passage 2 is controlled by a ported valve member 3 (Fig. III) which is rotatable upon a horizontal axis between closed position, in which passage 2 is blanked, and open position, in which the port 2a of the valve member lies in alignment with valve passage 2. For purposes of illustration, it will be assumed that the valve 1 is installed in a system for delivering water from an electrically driven pump 4 to an elevated reservoir 5, as illustrated in Fig. II.

A motor is provided for powerfully operating the valve member 3, and in this case a fluid-operated motor—a hydraulic cylinder and plunger unit a, b (Fig. I)—is organized with mechanism within housing 6 to rotate the valve member between its alternate positions. In my above noted patent, the mechanism alluded to is described in detail and suffice it herein to say that the rotary stem d of the valve within housing 1 is connected by a crank mechanism e to the lower end of the plunger b, whereby the upward and downward strokes of the plunger effect, respectively, the opening and closing of the valve member 3.

A four-way valve 7 controls the supply of fluid under pressure—water in this case—for operating the motor a, b. A pipe 8 leads from the control valve 7 to the top of motor cylinder a, and a pipe 9 leads from the valve to the bottom of the cylinder; a supply pipe 10 connects the control valve with the water in the downstream portion of the conduit C (cf. Fig. II), or with some other suitable body of power fluid under adequate superatmospheric pressure, and a discharge or exhaust pipe 11 opens from the control valve. In known manner, the control valve 7 includes an internal system of ports and passages severally communicating with the pipes 8 to 11, and severally subject to the control of valve elements, whose operating stems 12 project from the casing of the valve and cooperate with a control lever 13, mounted to swing about a fixed axis 14. An electric motor is arranged to operate the valve-controlling lever 13. The motor may, and in this case does, comprise an electromagnet 15 whose armature 16 is articulated to the distal end of the lever. A compression spring 18, mounted upon a post 17, exerts an upward thrust against the lever. The electromagnet 15, upon energization, is effective to draw the armature 16 downward, thereby swinging the lever 13 clockwise (Fig. I) against the resistance of spring 18, and shifting the valve-controlling stems into such position that the pipe 8 leading from the top of the cylinder a is connected to exhaust pipe 11, and power water is fed from inlet pipe 10 into the pipe 9 leading to the bottom of the cylinder. In consequence, the plunger b rises, and powerfully rotates the valve member 3 into open position. The valve member 3 remains in open position until the positions of the valve stems 12 are reversed, and in this case the valve member remains in open position so long as the electromagnet is energized and the lever is held in its illustrated position in Fig. I.

Upon the deenergizing of the electromagnet, the spring 18 swings the lever 13 counter-clockwise, raising the armature 16 of the electromagnet, and reversing the positions of the valve stems 12. Thereupon, the pipe 9 is vented to exhaust 11 and power water is fed into the pipe 8 leading to the top of the cylinder a. The plunger b moves downward, and the valve member 3 is rotated into closed position, in which position it remains until the electromagnet is energized.

In accordance with my invention, I provide means which operate under the influences of the pressure and velocity of the fluid within the conduit C in automatically controlling the energizing circuit of the electric motor (electromagnet) 15, which motor 15 in turn automatically controls the valve-operating motor a, b.

Turning to Fig. III, the energizing circuit 19 of the electromagnet 15 includes an electric make-and-break device, which advantageously comprises a mercury switch 20, mounted to swing about an axis 21 in a frame or housing 22. The circuit 19 derives its energy from any suitable electrical supply, say a battery, or power lines 23 which conveniently may be the same lines as energize the electrically driven pump 4, shown in Fig. II. In Fig. III the mercury switch 20 is shown in circuit-interrupting position, a spring 24 tending to hold the switch inclined, as shown, with the included globule 25 of mercury lying remote from the terminals 26 of the switch. Thus, the electromagnet 15 is deenergized; the lever 13 is held in elevated position by spring 18 (Fig. I); and the plunger b of the valve-operating motor is held at the lower end of its stroke, holding the valve member 3 in closed position, as shown in Fig. III.

On the upstream side of the valve member, I provide switch-operating means within a cylinder 27. Such cylinder includes a piston 28 embodying two body portions 28a and 28b of unequal diameters, engaging with sliding fit walls 27a and 27b of the cylinder. The lower, smaller end of the piston is adapted to seat over a port 29 communicating with the passage 2 of the valve (or with the interior of the conduit C) on the upstream side of the valve member 3. The cylinder 27 includes an inlet chamber 30 which communicates by way of suitable piping (not shown) with the fluid on the downstream side of the system; the chamber 30 communicates with the top of the piston 28, by way of a plunger-incompassing passage 31 and ports 32 and 33. A tappet rod 34 extends axially through the cylinder 27 and piston 28; the tappet rod passes with sliding fit through the top and bottom walls of the piston, and through a stuffing box 35 in the head 36 of the cylinder; and a valve element 87, secured upon the tappet rod, is adapted normally to seat from above in the top wall of the piston. A flap 37 is mounted on an axis 38 to swing athwart the passage 2, and a stem 39 interconnects the lower end of the tappet rod 34 with a rigid arm 40 extending angularly from the flap 37. When the valve member 3 is in closed position, the piston 28 is held to its seat (29) by the static head of the liquid on the downstream side of the valve. The normal positions of the other parts are as illustrated in Fig. III.

When the pump 4 (Fig. II) is set in operation, it builds up hydraulic pressure in the upstream side of the conduit C, and, as the pump comes up to normal speed, the pressure effective through port 29 increases to a value sufficient to overcome the static head effective upon the top of the piston. Under the influence of such pump pressure, the piston 28 rises, and carries the tappet rod 34 upward. The rising tappet rod engages a stem 41 depending from the mercury switch, and the continued ascent of the tappet rod effects the angular movement of the flap 37 into an angular position of about 45° to the vertical, and moves the mercury switch counter-clockwise into such position that its globule 25 of mercury runs to the left end of the tube (20) and electrically unites the switch poles 26. Thus, the circuit 19 is closed; the electromagnet 15 is energized; and in the manner already described, the valve-operating motor a, b rotates the valve member 3 into open position. Flow through the conduit C begins. As the velocity of flow rises to normal, the flap 37 is by the hydrodynamic force (the velocity head) of the stream swung into approximately horizontal position, forcing the tappet rod 34 further upward and lifting the valve element 87 from its seat. Such hydrodynamic force is effective upon flap 37 to hold the mercury switch 20 in circuit-closing position, whether or no the piston 28 returns to seated position when the pressures of the fluid on opposite sides of the valve member 3 approach equalization. And, manifestly, it is merely a matter of design and proportioning of the parts to obtain this operation for any given or desired velocity of flow in the conduit.

In the event that the velocity of flow decreases below a predetermined value (due to failure in the electric supply to the pump, or to a break in the conduit between the valve 1 and the pump, or for any other reason), the flap 37 swings downward; the static pressure of the fluid on the downstream side of the valve moves and holds the piston 28 to its seat (29); the tappet rod 34 moves downward; the mercury switch swings clockwise, and interrupts the energizing circuit 19 of the electromagnet. Accordingly, the spring 18 swings the lever 13 upward; the control valve 7 is operated, and the motor a, b effects the rotation of the valve member 3 into closed position.

Under normal condition of the pumping system, it sometimes may be desirable to hold the valve member 3 in closed position after the pump 4 has reached and is operating at normal speed. To this end I provide a normally closed circuit-breaker 42 in the circuit 19. By opening this circuit-breaker, the electromagnet 15, manifestly, cannot be energized by the rise of the tappet rod 34. The valve member 3 is in effect "locked" in closed position, irrespective of the hydraulic pressure in the upstream portion of the conduit. Alternately, if the valve member be already in open position, the opening of the circuit-breaker 42 will deenergize the electromagnet 15, whereby the valve member 3 will be automatically closed and will be "locked" in closed position, regardless of the position of switch 20.

In case it should prove desirable to open the valve member 3 independently of the mercury switch 20 and its associated operating mechanism, I provide an auxiliary energizing circuit 43 for the electromagnet 15. Such auxiliary circuit includes a normally open switch 44.

Normally such auxiliary circuit and the open switch 44 do not affect the above-described automatic operation of the valve 1. The closing of the switch 44, however, energizes the electromagnet 15 and effects the movement of the valve member 3 into open position, or, if the valve be already in open position, the closing of such switch operates to "lock" the valve in open position, regardless of the conditions of flow within the conduit C. Thus, it will be understood that the switches 42 and 44 and circuit 43 comprise electrical interlock means; that is, means which are operable in such manner that the armature 16 of electric motor 15 may be held or electrically locked in either of its alternate positions. Such means serve to neutralize the mercury switch 20 and its associated automatic mechanism. And, of course, these switches may be located at some point removed from the valve 1, say in the switchboard of a control station, whereby, by remote control, the valve may be "locked" in either of its alternate positions, or may be operated to meet any condition arising in service.

Additionally, I provide means in immediate association with the valve 1, whereby manually controlled operation may be effected by an attendant stationed at the valve. As shown in Fig. I, such means comprise an arm 45, pivotally mounted on the top of post 17. By throwing the arm 45 from its normally ineffective position, shown in full lines, to its dotted line position, the lever 13 is engaged by an extension 45a on the arm and swung downward. Operation of the motor a, b follows, and the valve member 3 is turned into open position. In the dotted line position of the arm 45, the lever 13 is positively locked in its lower, valve-opening position. If it should happen that the valve member 3 is already open when the arm 45 is thrown, no operation occurs, the lever 13 is merely locked in its lower position until such time as the arm 45 is thrown back into horizontal position. When this is done, the spring 18 effects the upward swing of lever 13, and the valve member is automatically closed, unless conditions of flow within the conduit C are such as to sustain the mercury switch 20 in circuit-closing position.

Fig. IV illustrates a modification in the means for effecting the automatic control of the mercury switch within housing 22. Such means consist of a flexible diaphragm, say a diaphragm 46 of rubber, which is sealed peripherally in a chamber 47 and medially reinforced by means of metal plates 48 and 49. The tappet rod 34a extends with sliding fit through the diaphragm and plates, and carries a valve element 87a that seats upon the upper plate, while the lower end of the tappet rod is connected to a flap member 37a in the manner already described. The diaphragm is subject on its nether face to the pressure of fluid in the upstream portion of the conduit, while, by means of a pipe 50, the pressure of the fluid in the downstream portion of the conduit prevails above the diaphragm. The diaphragm responds to the pressure conditions of the fluid on opposite sides of the valve member 3, and moves upward and downward, as the case may be, substantially in the manner the piston 28 moves. And the automatic control of the mercury switch, and of the energizing circuit 19 of the electromagnet, is substantially the same as that already described.

It will be apparent to those skilled in the art that many changes may be made in the above-described apparatus without departing from the essence of my invention.

I claim as my invention:

1. In a conduit for liquid, said conduit including a flow-controlling valve having a valve-member movable between open and closed positions, a hydraulic motor for operating said valve-member, means for supplying motor-operating liquid to said hydraulic motor, said means including a valve-device for controlling the supply of liquid to said hydraulic motor, an electric motor for operating said valve-device, an energizing circuit for said electric motor, and a mercury switch mounted to shift between circuit-closing and circuit-interrupting positions; the combination of a member responsive to difference in hydraulic pressure on opposite sides of the valve in said conduit for shifting said switch between its alternate positions, and a member responsive to velocity head of the liquid flowing in said conduit for holding said switch in one of its alternate positions.

2. In a conduit for liquid, said conduit including a flow-controlling valve having a valve-member movable between open and closed positions, a hydraulic motor for operating said valve-member, means for supplying motor-operating liquid to said hydraulic motor, said means including a valve-device for controlling the supply of liquid to said hydraulic motor, an electric motor for operating said valve-device, an energizing circuit for said electric motor, and a make-and-break device controlling said circuit; the combination of automatic means responsive to hydraulic conditions within said conduit for alternately opening and closing said make-and-break device, whereby said electric motor automatically effects, through said valve-device and hydraulic motor, the alternate opening and closing of said valve, and means subject to remote control for electrically locking said electric motor in one or the other of its alternate positions of operation, whereby said valve may be held in either opened or closed position irrespective of hydraulic conditions within said conduit.

3. In control apparatus for a valve controlling fluid flow, the combination of an electric motor, an energizing circuit for said motor, means responsive to pressure conditions of said fluid for controlling said circuit, and means including an auxiliary circuit for electrically holding said motor energized independently of the operation of said circuit-controlling means.

4. In control apparatus for a valve controlling fluid flow, the combination of an electric motor including an armature movable between several positions of service, an energizing circuit for said motor, means responsive to pressure conditions of said fluid for automatically controlling said circuit, and manually controlled electrical means operable independently of the operation of said last-mentioned means for holding said armature in one of its said positions.

5. In control apparatus for a valve controlling fluid flow, the combination of an electric motor including an armature movable between alternate positions of service, an energizing circuit for said motor, means responsive to pressure conditions of said fluid for automatically controlling said circuit, and manually controlled electrical means operable to neutralize said automatic circuit-controlling means, whereby said armature may be held in one or the other of its positions.

6. In control apparatus for a valve controlling fluid flow, the combination of an electric motor, an energizing circuit for said motor, a circuit make-and-break device, and means for automatically operating said make-and-break device, said means including a member responsive to pressure head of said fluid, and a member adapted to extend into the line of flow of said fluid and being responsive to the velocity head thereof.

7. In control apparatus for a valve controlling fluid flow, the combination of an electric motor, an energizing circuit for said motor, a circuit make-and-break device, and means for automatically operating said make-and-break device, said means including a member responsive to difference in pressure of said fluid on opposite sides of the valve controlling the flow of such fluid, and means responsive to velocity head of the flowing fluid.

8. A circuit-controlling device for an electric motor adapted to control a valve in a conduit for fluid, said device including electric contacts, and means for effecting the electrical closing and opening of said contacts, said means including a member responsive primarily to pressure head of said fluid, and a member responsive to velocity head of such fluid.

9. A circuit-controlling device for an electric motor adapted to control a valve in a conduit for fluid, the combination of a mercury switch mounted to swing between circuit-closing and circuit-interrupting positions, a switch-throwing element responsive both to pressure head and velocity head of said fluid.

10. In a conduit for liquid, the combination of a flow-controlling valve including a conical valve-member rotatable in opposite directions between open and closed positions, a hydraulic motor and associated mechanism for rotating said valve-member, means for supplying motor-operating liquid from the downstream side of said valve to said motor, said means including a valve-device for controlling the supply of such liquid to said hydraulic motor, an electric motor for operating said valve-device, an energizing circuit for said electric motor, and means movable between alternate positions for automatically operating and closing said circuit in response to variations in pressure differential of the liquid on opposite sides of said valve-member, whereby said electric motor, said valve-device, and said hydraulic motor are operated for automatically opening and closing said valve, said circuit-controlling means including a control element responsive in operation to the velocity head of liquid flowing through said conduit for automatically maintaining said last means in one of said alternate positions, whereby said valve-member is maintained, under predetermined conditions of flow, in one of its alternate positions of adjustment.

THOR GANNESTAD.